United States Patent [19]

Pokrandt et al.

[11] Patent Number: 4,881,921

[45] Date of Patent: Nov. 21, 1989

[54] FLEXIBLE SHAFT COUPLING WITH COATED GRID

[75] Inventors: Glenn C. Pokrandt, Menomonee Falls; William F. Busser, Pewaukee; Donald N. Timmermann, Wauwatosa; Thomas N. Kuliga, West Allis, all of Wis.

[73] Assignee: The Falk Corporation, Milwaukee, Wis.

[21] Appl. No.: 166,432

[22] Filed: Mar. 10, 1988

[51] Int. Cl.⁴ ............................................. F16D 3/52
[52] U.S. Cl. .................................... 464/54; 464/147
[58] Field of Search .................. 464/51, 54, 81, 85, 464/87, 106, 147, 160

[56] References Cited

U.S. PATENT DOCUMENTS

| | | | |
|---|---|---|---|
| 1,587,403 | 6/1926 | Nicholson | 464/81 |
| 1,763,842 | 6/1930 | Bibby | 464/54 |
| 1,939,207 | 12/1933 | Duckworth | 464/85 |
| 2,540,703 | 2/1951 | Wellauer | 464/85 X |
| 2,619,211 | 11/1952 | Belden | 464/72 X |
| 2,885,871 | 5/1959 | Wellauer | 464/54 |
| 2,924,082 | 2/1960 | Reich | 464/76 |
| 2,958,213 | 11/1960 | Donner | 464/83 |
| 3,096,632 | 7/1963 | Wellauer et al. | 464/54 |
| 3,304,743 | 2/1967 | Paulsen | 464/72 |
| 3,434,303 | 3/1969 | Leyer | 464/83 X |
| 3,677,033 | 7/1972 | Kneeland | 464/85 |
| 4,214,458 | 7/1980 | Philleo | 464/85 |
| 4,413,980 | 11/1983 | Walloch | 464/82 |
| 4,487,591 | 12/1984 | Berg | 464/85 |
| 4,627,885 | 12/1986 | Arlt | 156/160 |

FOREIGN PATENT DOCUMENTS 724829  3/1980  U.S.S.R. ............................. 464/85

*Primary Examiner*—Daniel P. Stodola
*Attorney, Agent, or Firm*—Quarles & Brady

[57] ABSTRACT

A flexible shaft coupling of the type which uses a serpentine metal grid to connect teeth on hubs attached to driving and driven shafts has the sides of the grid rung which contact the metal teeth provided with a layer of deformable material. The layer of deformable material will deform under torque load relative to the metal teeth and metal grid and absorb differences in tooth or rung spacing or parallelism to thereby insure a more even load distribution between the rungs and teeth. A preferred deformable material is a urethane having excellent tensile strength and hardness as well as good elongation, wear resistance and flexural modulus properties.

7 Claims, 1 Drawing Sheet

FLEXIBLE SHAFT COUPLING WITH COATED GRID

BACKGROUND OF THE INVENTION

This invention relates to shaft couplings, and more particularly to improvements in couplings of the type that use a grid of metal rungs to join coupling halves.

A common form of flexible coupling used for joining driving and driven shafts utilizes a metal grid to join coupling halves mounted on the shafts being coupled. The grid is often formed as a serpentine with straight grid rungs joined together at alternate ends by integral end loops. The rungs are received in radially aligned, axially extending slots formed between metal teeth on each of the coupling hubs. The rungs span the space between the coupling halves and act to transmit torque between the hubs. The side walls of the teeth are generally curved in an axial direction so that the unsupported length of each rung is reduced as the torsional load transmitted between the coupling halves increases. An early example of this type of flexible coupling is found in U.S. Pat. No. 1,763,842 issued June 17, 1930 to Bibby.

In the prior flexible couplings of this type, the rungs and the hubs are made of metal, usually steel, and the rungs are heat treated.

This form of flexible coupling provides an effective device for joining shafts. However, because of variations in the circumferential tooth spacing and grid rung spacing and parallelism resulting from the manufacturing processes, under a given load one or more rungs may be out of full contact with the adjacent teeth. This is particularly true at lower torque loads. Such uneven contact means that all grid rungs and all teeth will not carry the same load and an undesirable uneven load distribution is the result. Thus far, the inherent flexibility of the grid has been relied upon to eventually, at high load, evenly distribute the load between all rungs and all teeth.

SUMMARY OF THE INVENTION

In accordance with the invention we provide an improved flexible coupling of the type having a pair of hubs each including a plurality of axially extending metal teeth whose adjacent side faces define slots therebetween, and a grid joining the hubs and which includes a plurality of metal rungs received in the slots and spanning the space between the hubs, and wherein the sides of the rungs that are to contact the teeth are formed with a layer of a deformable material which deforms relative to the metal of the rungs and relative to the metal of the teeth as the coupling is subjected to torque loads.

The preferred deformable material is a polyurethane resin material, and in particular, is a liquid cast polyether base urethane thermoset material that is cross linked and which exhibits high tensile strength and hardness, with good elongation, abrasion resistance and flexural modulus properties.

The entire outer surface of the grid may be coated with the deformable material, or only the sides of each rung may be so coated. In either case, the coating will deform under load and result in a more even distribution of the load through all rungs and teeth by insuring that all rungs will be in contact with their respective teeth when under load.

The improved load distribution provides increased fatigue life with reduced contact stress between the rungs and the teeth. The deformable material of urethane or other similar material will also reduce the wear on the teeth during operation both because of the lower coefficient of friction that the urethane material provides and the improved surface finish that can result from forming the deformable layer directly in a molding or coating operation without machining. As a result, the need for lubrication between the grid and teeth may be entirely eliminated.

It is a principal object of the invention to provide a flexible coupling that has improved load distribution between rungs and hub teeth joined by the rungs, and which results in increased fatigue life.

It is also an object of the invention to provide a flexible shaft coupling using rungs joining hubs on driving and driven shafts that does not require lubrication between the rungs and hub teeth.

The foregoing and other objects and advantages of the invention will appear in the following detailed description. In the description reference is made to the accompanying drawing which illustrates a preferred embodiments of the invention.

DETAILED DESCRIPTION OF THE PREFERRED EMBODIMENT

Figure 1:
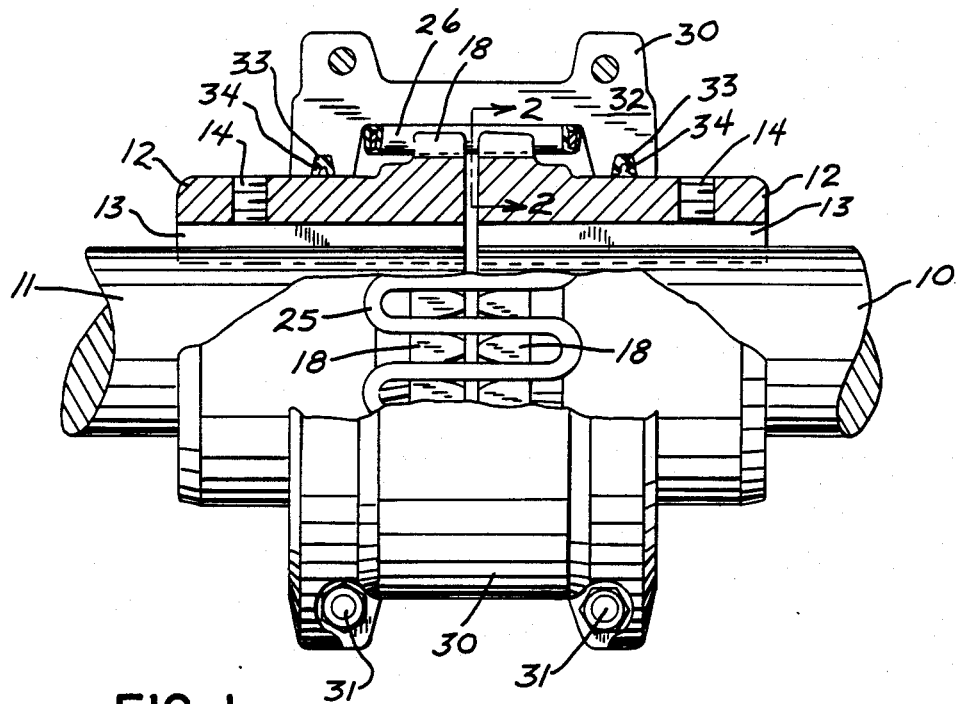
FIG. 1 is a view in elevation and partly in section of a coupling according to the present invention.

A flexible coupling incorporating the improvement of the present invention acts as a common connection between a driving shaft 10 and a driven shaft 11. The coupling includes a pair of similar hubs 12 that are bored to receive the shafts 10 and 11. The hubs 12 are provided with slots to receive keys 13 that are also received in cooperating slots provided in the shafts 10 and 11 to thereby transmit torque between the hubs 12 and the shafts. Set screws 14 fix the hubs 12 relative to the keys 13 and thereby prevent axial movement of the hubs on their respective shafts.

Figure 2:
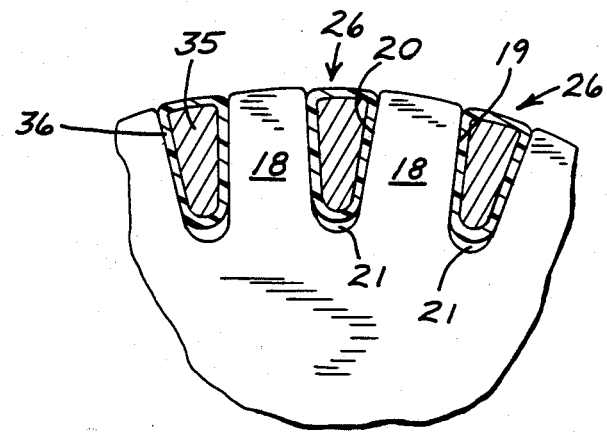
FIG. 2 is a partial view in section of the coupling teeth and interlinking grid of the coupling and taken in the plane of the line 2—2 of FIG. 1.

Each hub 12 has a plurality of radially projecting, circumferentially spaced and axially directed teeth 18. As shown in FIG. 2, each tooth 18 has side faces 19 and 20 that converge slightly in a radially outward direction. The result is that tapered slots 21 are defined between the side faces 19 and 20 of adjacent teeth 18.

Figure 3:
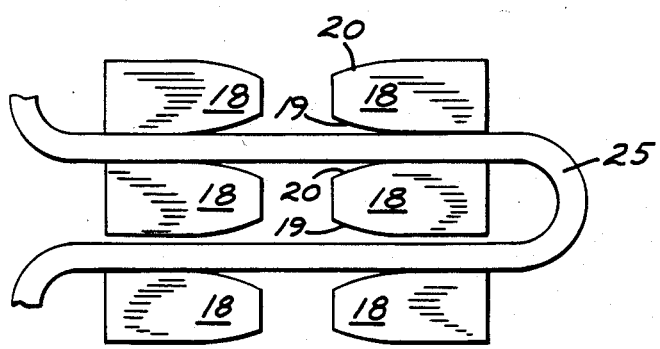
FIG. 3 is a fragmentary view in elevation of the coupling teeth and interlinking grid of the coupling shown in an unloaded, relaxed condition.

A flexible serpentine grid 25 joins the two hubs 12. The grid 25 has straight rung portions 26 that are received in the slots 21 between the teeth 18 of aligned hubs 12. As shown in FIG. 3, the sides 19 and 20 of the teeth 18 are curved with their axes of revolution in a plane perpendicular to the axis of the shafts 10 and 11. The curvature is exaggerated in the drawings.

Suitable coupling cover members 30, which may be identical, are provided to act as a shield to prevent the entry of dust and grit and to hold the grid 25 in place. The cover members 30 are joined to each other by bolts 31 at abutting faces 32 of the members. The cover members 30 together provide continuous annular cavities 33 that receive resilient sealing rings 34 disposed against the periphery of the hub 12.

In the typical flexible coupling with a serpentine grid, an increase in the torque load on the coupling will cause the hub members 12 on the two shafts to assume an increased angular displacement relative to each other. This will cause the straight rungs 26 of the grid 25 to advance their contact along the curved sides of the teeth toward the space between the hubs. This results in the known decrease in the unsupported span of the rungs which then function essentially as short beams. Thus, as the load increases, the unsupported length of the rungs decreases and the grid member becomes stiffer and increasingly restrains angular displacement of the coupling hubs.

The grid 25 is formed with a metal interior substrate 35 and a layer 36 of a deformable material surrounding the entire substrate 35. As a result, the sides of the rung portions 26 that encounter the side faces 19 and 20 of the teeth are layered with the deformable material.

As shown exaggerated in FIG. 3, the manufacturing processes of forming the teeth 18 and the grid 25 may result in uneven circumferential spacing between teeth 18 or between rung portions 26 of the grid 25 so that at rest there may be unequal contact between the teeth 18 and rungs 26. The same result may occur if there is a lack of parallelism between adjacent rungs 26. Such unequal contact will not necessarily be overcome under load, particularly at lower torque loads. An uneven load distribution between the teeth 18 and rungs 26 results and this uneven load distribution can result in premature fatigue failure in the overloaded rungs or teeth. The layer 36 of deformable material will function to eliminate such uneven load distribution by taking up the variations in spacings and parallelism as the coupling is subjected to torque load.

The deformable material of the layer 36 must be capable of deforming to a greater degree than the metal of the teeth 18 or of the grid substrate 35. In addition to being relatively deformable, the deformable material should exhibit excellent tensile strength and hardness and good elongation, abrasion resistance, and flexural modulus properties. Polyurethanes have such a combination of properties, as do other natural and synthetic resin materials.

The preferred urethane material is a polyether based urethane thermoset material which is cross-linked. A particularly useful material is that identified as compound 1603-75 available from Albert Trostel Packings, Ltd., Lake Geneva, WI. Such compound incorporates toluene diisocyanate and is cured using 4,4$^1$-methylenebis (2-choroaniline). The physical properties of the material are as follows:

Each layer 36 of deformable material on the grid 25 should preferably represent at least ten percent of the total width of the rung 26 at its widest point. In any event, the layer 36 must be of a thickness that is greater than the anticipated circumferential error in the tooth or rung spacing or in the rung parallelism so that the layers 36 of the respective rungs 26 can deform under load and take up or absorb all of the error.

Although the preferred embodiment has a layer 36 surrounding the entire perimeter of the metal substrate 35, it is possible to provide a layer of deformable material only on the sides of the metal substrate 35 that will be in contact with the side faces 19 and 20 of the teeth 18.

The layer 36 may be formed by any casting, molding or coating process. Forming of the layer by any of such processes can produce a very fine surface finish. Urethane has very good wear resistance. Therefore, the combination of good wear resistance and a fine surface finish makes it possible to eliminate the need for any lubrication between the grid and the teeth of the coupling.

I claim:

1. In a flexible coupling having a pair of hubs each including a plurality of axially extending metal teeth whose adjacent side faces define slots therebetween, and a metallic grid joining the hubs and which includes a plurality of stiff metal rungs received in the slot and spanning the space between the hubs and integral end loops connecting adjacent rungs in an area axially displaced from the hub teeth, the improvement wherein:
   the sides of the rungs in contact with the teeth have a layer of a deformable material which deforms relative to the teeth and the rungs as the coupling is subjected to torque loads, said layer having a thickness in excess of the largest anticipated manufacturing error in the circumferential spacing between the teeth or the rungs.

2. A coupling in accordance with claim 1 wherein the layer is formed of a polyurethane.

3. A coupling in accordance with claim 2 wherein the polyurethane is a polyether based urethane thermoset material having relatively high tensile strength and hardness.

4. A coupling in accordance with claim 3 wherein the tensile strength is about 7900 psi.

5. A coupling in accordance with claim 3 wherein the hardness is about 76 Shore D.

6. In a flexible coupling having a pair of hubs each including a plurality of axially extending metal teeth whose adjacent side faces define slots therebetween, and a serpentine metal grid joining the hubs and which includes a plurality of stiff metal rungs received in the slots and that span the space between the hubs and integral end loops connecting adjacent rungs, the improvement wherein:
   the rungs have an outer layer of a deformable material that deforms relative to the metal of the teeth and the metal of the rungs as the coupling is subjected to torque loads, said outer layer having a thickness in excess of the largest anticipated manufacturing error in the circumferential spacing between the teeth or the rungs.

7. A coupling in accordance with claim 6 wherein the layer is formed of a polyurethane.

* * * * *

UNITED STATES PATENT OFFICE
CERTIFICATE OF CORRECTION

Page 1 of 2

Patent No. 4,881,921　　　　Dated November 21, 1989

Inventor(s)　Glenn C. Pokrandt, et al.

It is certified that error appears in the above-identified patent and that said Letters Patent is hereby corrected as shown below:

Column 3, line 54, after "follows:" add the following text:

| | |
|---|---|
| Tensile Strength <br> D-412 psi | 7900 |
| 100% Modulus <br> D-412 psi | 5900 |
| Elongation <br> D-412 | 170% |
| Tear Strength <br> D-624 Die "C" pli | 1050 |
| D-1938 Split pli | 250 |
| D-470 Split pli | 120 |
| Compression Set <br> D-395 B 22 hrs. @ 158°F | 70% |
| D-395 A 22 hrs @ 158°F | 2% |
| Compression Modulus <br> 10% psi | 4300 |
| 25% psi | 8000 |

UNITED STATES PATENT AND TRADEMARK OFFICE
CERTIFICATE OF CORRECTION

PATENT NO. : 4,881,921

DATED : November 21, 1989

INVENTOR(S) : Glenn C. Pokrandt, et al

It is certified that error appears in the above-identified patent and that said Letters Patent is hereby corrected as shown below:

<u>Resilience</u>
Bashore D-2632                    52%

<u>Solenoid Brittle Point</u>
D-746                             -90°F

<u>Heat Distortion Temp</u>
D-648 @ 264 psi                   134°F

<u>Impact Strength</u>
D-256 Notched Izod                13 Ft-
lb/in

<u>Flexural Modulus</u>
D-790
                                  140,00
0 psi

<u>Specific Gravity</u>            1.18

<u>Hardness</u>
D-2240 Shore D                    76

Signed and Sealed this

Eighth Day of January, 1991

*Attest:*

HARRY F. MANBECK, JR.

*Attesting Officer*  *Commissioner of Patents and Trademarks*